(12) United States Patent
Fujii et al.

(10) Patent No.: US 11,884,803 B2
(45) Date of Patent: Jan. 30, 2024

(54) SHEET TRANSPORT ROLLER RUBBER COMPOSITION AND SHEET TRANSPORT ROLLER

(71) Applicant: SUMITOMO RUBBER INDUSTRIES, LTD., Hyogo (JP)

(72) Inventors: Ryosuke Fujii, Hyogo (JP); Masashi Hamakubo, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 17/888,492

(22) Filed: Aug. 16, 2022

(65) Prior Publication Data

US 2023/0193008 A1 Jun. 22, 2023

(30) Foreign Application Priority Data

Dec. 20, 2021 (JP) .................. 2021-206157

(51) Int. Cl.
*C08L 23/16* (2006.01)
*C08J 3/00* (2006.01)
*C08J 3/24* (2006.01)
*B65H 27/00* (2006.01)

(52) U.S. Cl.
CPC .............. *C08L 23/16* (2013.01); *B65H 27/00* (2013.01); *C08J 3/005* (2013.01); *C08J 3/247* (2013.01); *B65H 2404/10* (2013.01); *C08J 2323/16* (2013.01); *C08J 2445/02* (2013.01); *C08L 2312/00* (2013.01)

(58) Field of Classification Search
CPC ...... C08L 45/02; C08L 2312/00; C08L 23/16; C08J 2445/02
See application file for complete search history.

(56) References Cited

U.S. PATENT DOCUMENTS 3,402,140 A * 9/1968 Bickel ..................... C08K 3/22
525/185

FOREIGN PATENT DOCUMENTS

JP H0714770 B2 * 2/1995
JP 2000302268 10/2000
JP 2001348127 A * 12/2001

* cited by examiner

*Primary Examiner* — Mark S Kaucher
(74) *Attorney, Agent, or Firm* — JCIPRNET

(57) ABSTRACT

A rubber composition capable of manufacturing a sheet transport roller having an excellent friction coefficient and wear resistance. A sheet transport roller rubber composition contains an ethylene-α-olefin-diene copolymer as a base rubber, a sulfur-based crosslinking agent, and a coumarone-indene resin. It is preferable that the sheet transport roller rubber composition be obtained by mixing the base rubber and the coumarone-indene resin at a temperature equal to or higher than a softening point of the coumarone-indene resin to prepare a mixture, and then mixing this mixture with a sulfur-based crosslinking agent.

5 Claims, 1 Drawing Sheet

SHEET TRANSPORT ROLLER RUBBER COMPOSITION AND SHEET TRANSPORT ROLLER

CROSS-REFERENCE TO RELATED APPLICATION

This application claims the priority benefit of Japan application serial no. 2021-206157, filed on Dec. 20, 2021. The entirety of the above-mentioned patent application is hereby incorporated by reference herein and made a part of this specification.

BACKGROUND

Technical Field

The present disclosure relates to rubber compositions used in formation of sheet transport rollers.

Description of Related Art

Various sheet transport rollers are integrated in a sheet transport mechanism in image forming apparatuses such as electrostatic copiers, laser printers, plain paper facsimile machines, multifunction devices thereof, and ink jet printers; and equipment such as automated teller machines (ATM). The sheet transport roller rotates while in contact with a sheet of such as paper or plastic film, and transports the sheet by friction.

As a material for the sheet transport roller, an ethylene-propylene-diene monomer copolymer (EPDM) is often used from the viewpoint of price and ozone resistance performance. However, in the rollers manufactured using EPDM, the friction coefficient is likely to decrease due to the influence of components (also referred to as paper dust) such as fillers contained in the paper. Therefore, increasing the initial friction coefficient of a sheet transport roller has been considered.

For example, Patent Document 1 describes a rubber member for preventing double feeding of a paper feed device, in which EPDM is contained as a main component, a white rubber reinforcing agent is used as a reinforcing agent, and a wear-resistant white rubber is incorporated (refer to Patent Document 1). In the rubber member of Patent Document 1, a peroxide is used as a crosslinking agent.

PATENT DOCUMENTS

[Patent Document 1] Japanese Patent Laid-Open No. 2000-302268

SUMMARY

In Patent Document 1, using a tackifier in order to enhance the grip force of the rubber member is proposed. However, in a rubber composition using a peroxide as a crosslinking agent, the wear resistance tends to decrease when a coumarone-indene resin is incorporated.

The present disclosure has been made in view of the above circumstances, and provides a rubber composition with which a sheet transport roller having excellent friction coefficient and wear resistance is able to be manufactured.

A sheet transport roller rubber composition according to the present disclosure that can solve the above-described problem, contains an ethylene-α-olefin-diene copolymer as a base rubber, a sulfur-based crosslinking agent, and a coumarone-indene resin.

When the rubber composition contains an ethylene-α-olefin-diene copolymer as a base rubber, a sulfur-based crosslinking agent, and a coumarone-indene resin, the friction coefficient and wear resistance of the cured product are improved.

A sheet transport roller according to the present disclosure is obtained by curing the sheet transport roller rubber composition.

According to the present disclosure, a sheet transport roller having an excellent friction coefficient and wear resistance can be manufactured.

DESCRIPTION OF THE EMBODIMENTS

<Sheet Transport Roller Rubber Composition>

Figure 1:
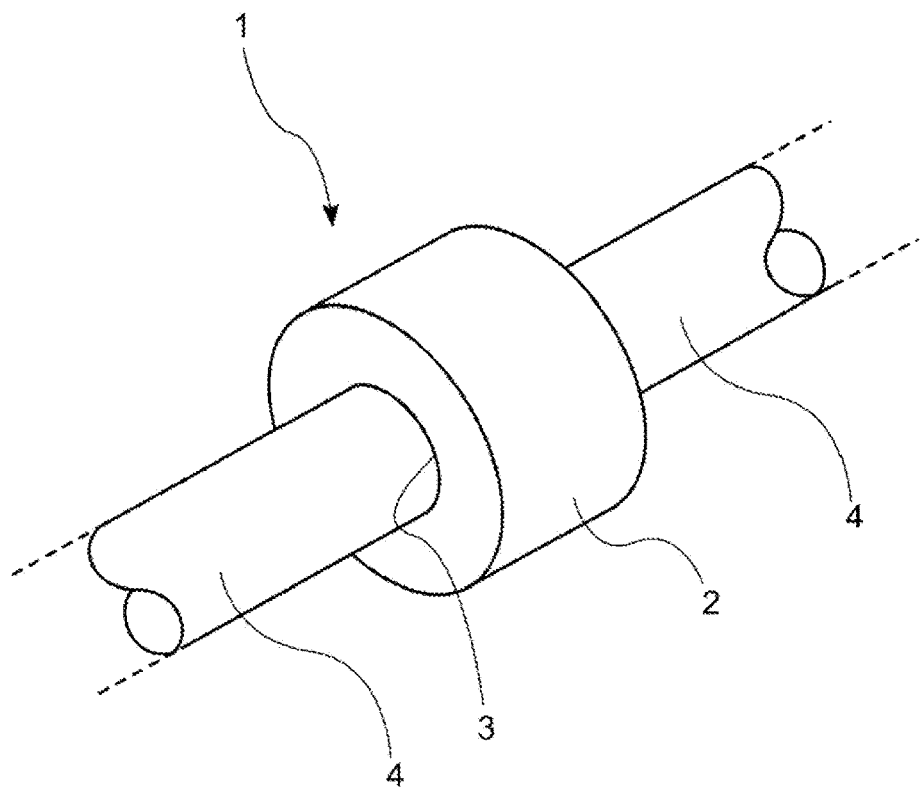
FIG. 1 is a perspective view showing an example of a sheet transport roller of the present disclosure.

The sheet transport roller rubber composition (hereinafter, may be simply referred to as "rubber composition") contains an ethylene-α-olefin-diene copolymer as a base rubber, a sulfur-based crosslinking agent, and a coumarone-indene resin.

(Base Rubber)

The rubber composition contains an ethylene-α-olefin-diene copolymer as a base rubber. The ethylene-α-olefin-diene copolymer is a copolymer in which a double bond is introduced into the main chain by adding a small amount of a diene component to ethylene and an α-olefin. The ethylene-α-olefin-diene copolymers may be used alone or in combination of two or more.

Examples of the α-olefin include propylene, 1-butene, 1-hexene, 1-octene, and the like.

Examples of the diene component include ethylidene norbornene (ENB), 1,4-hexadiene (1,4-HD), dicyclopentadiene (DCPD), and the like, and ethylidene norbornene is preferable.

Examples of the ethylene-α-olefin-diene copolymer include ethylene-propylene-diene copolymer (EPDM), ethylene-butene-diene copolymer (EBDM), and ethylene-propylene-butene-diene copolymer (EPBDM).

In the ethylene-α-olefin-diene copolymer, the content of ethylene components is preferably 40% by mass or more, more preferably 42% by mass or more, and further preferably 43% by mass or more, and preferably 79% by mass or less, more preferably 78% by mass or less, and further preferably 77% by mass or less. This is because, when the content of ethylene units is within the above range, the ethylene-α-olefin-diene copolymer is easily obtained as a commercially available product, can be molded as a sheet transport roller, and becomes a rubber suitable for a sheet transport roller.

In the ethylene-α-olefin-diene copolymer, the content of diene components is preferably 0.5% by mass or more, more preferably 0.7% by mass or more, and further preferably 1.0% by mass or more, and preferably 15% by mass or less, more preferably 14% by mass or less, and further preferably 13% by mass or less. This is because, when the content of diene units is within the above range, the ethylene-α-olefin-diene copolymer is easily obtained as a commercially available product, can be molded as a sheet transport roller, and becomes a rubber suitable for a sheet transport roller.

The ethylene-α-olefin-diene copolymer may be an oil-extended type in which the flexibility is adjusted by adding an extender oil, or a non-oil-extended type in which an extender oil is not added, and any of these can be used. In the case of the oil-extended type, the mass of the added extender oil is treated as a processing aid.

The base rubber is preferably composed only of an ethylene-α-olefin-diene copolymer. The base rubber may contain a rubber component other than the ethylene-α-olefin-diene copolymer. In this case, the content of the ethylene-α-olefin-diene copolymer in the base rubber is preferably 50% by mass or more, more preferably 80% by mass or more, and further preferably 90% by mass or more.

Examples of the other rubber components include epichlorohydrin-based rubber, ethylene-propylene copolymer (EPM), ethylene-butene copolymer (EBR), ethylene-octene copolymer (EOR), acrylonitrile butadiene rubber (NBR), styrene-butadiene rubber (SBR), natural rubber (NR), isoprene rubber (IR), chloroprene rubber (CR), acrylic rubber, butyl rubber, and silicone rubber. These other rubber components may be used alone or in combination of two or more.

(Coumarone-Indene Resin)

The rubber composition contains a coumarone-indene resin. By incorporating the coumarone-indene resin, the friction coefficient of the obtained roller can be increased.

The coumarone-indene resin is a copolymer containing coumarones and indenes as monomer components, and the total content of coumarones and indenes in all the monomer components is 50% by mass or more.

Examples of the coumarones include coumarone and methyl coumarone. The content of coumarones in all the monomer components is preferably 1% by mass to 20% by mass.

Examples of the indenes include indene and methyl indene. The content of indenes in all the monomer components is preferably 40% by mass to 95% by mass.

The coumarone-indene resin may contain monomer components other than coumarones and indenes. Examples of the other monomer components include styrene, vinyltoluene, and dicyclopentadiene.

The softening point of the coumarone-indene resin is preferably 200° C. or lower, and more preferably 150° C. or lower. When the softening point is 200° C. or lower, uniform mixing with rubber becomes easy at the time of kneading. The lower limit of the softening point of the coumarone-indene resin is not particularly limited, but is usually approximately −25° C. Further, from the viewpoint of kneading workability, the softening point of the coumarone-indene resin is preferably 40° C. or higher, and more preferably 60° C. or higher. The softening point of the coumarone-indene resin is measured in accordance with JIS K2207 (2006).

The content of the coumarone-indene resin in the rubber composition is preferably 1 part by mass or more, more preferably 3 parts by mass or more, and further preferably 4 parts by mass or more, and preferably 15 parts by mass or less, more preferably 13 parts by mass or less, and further preferably 12 parts by mass or less with respect to 100 parts by mass of the base rubber. When the content of the coumarone-indene resin is 1 part by mass or more, the friction coefficient of the obtained roll is further improved, and when the content is 15 parts by mass or less, the processability such as kneading processability of the rubber composition is good.

(Crosslinking Agent)

The rubber composition contains a sulfur-based crosslinking agent as a crosslinking agent. By crosslinking the rubber composition containing the ethylene-α-olefin-diene copolymer and the coumarone-indene resin with a sulfur-based crosslinking agent, the effect of improving the friction coefficient of the cured product is further enhanced and decrease in wear resistance can be suppressed.

Examples of the sulfur-based crosslinking agent include sulfur and organic sulfur-containing compounds. Examples of the sulfur include powdered sulfur, oil-treated powdered sulfur, precipitated sulfur, colloidal sulfur, and dispersible sulfur. Examples of the organic sulfur-containing compound include tetramethylthiuram disulfide and N,N-dithiobismorpholine. Sulfur is preferable as the crosslinking agent. The sulfur-based crosslinking agents may be used alone or in combination of two or more.

The content of the sulfur-based crosslinking agent in the rubber composition is preferably 0.1 parts by mass or more, and more preferably 0.2 parts by mass or more, and preferably 10 parts by mass or less, and more preferably 5 parts by mass or less with respect to 100 parts by mass of the base rubber. When the content of the sulfur-based crosslinking agent is 0.1 parts by mass or more and 10 parts by mass or less, a crosslinked product suitable for a roller can be obtained.

(Vulcanization Accelerator)

The rubber composition may contain a vulcanization accelerator. As the vulcanization accelerator, either an inorganic accelerator or an organic accelerator can be used. Examples of the inorganic accelerator include slaked lime, magnesia (MgO), litharge (PbO) and the like. Examples of the organic accelerator include a thiazole-based accelerator, a thiuram-based accelerator, a sulfenamide-based accelerator, a dithiocarbamate-based accelerator, and the like. The vulcanization accelerators may be used alone or in combination of two or more. As the vulcanization accelerator to be combined with the sulfur-based crosslinking agent, it is preferable to use a thiazole-based accelerator and a thiuram-based accelerator in combination.

Examples of the thiazole-based accelerator include 2-mercaptobenzothiazole, di-2-benzothiazolyl disulfide, 2-mercaptobenzothiazole zinc salt, 2-mercaptobenzothiazole cyclohexylamine salt, 2-(N,N-dimethylthiocarbamoylthio)benzothiazole, and 2-(4'-morpholinodithio)benzothiazole, and di-2-benzothiazolyl disulfide is preferable.

Examples of the thiuram-based accelerator include tetramethylthiuram monosulfide, tetramethylthiuram disulfide, tetraethylthiuram disulfide, tetrabutylthiuram disulfide, tetrakis(2-ethylhexyl)thiuram disulfide, and dipentamethylene thiuram tetrasulfide, and tetramethylthiuram monosulfide is preferable.

The amount of the thiazole-based accelerator used is preferably 0.1 parts by mass or more and 10 parts by mass or less with respect to 100 parts by mass of the base rubber.

The amount of the thiuram-based accelerator used is preferably 0.1 parts by mass or more and 10 parts by mass or less with respect to 100 parts by mass of the base rubber.

(Vulcanization Acceleration Aid)

The rubber composition may contain a vulcanization acceleration aid. Examples of the vulcanization acceleration aid include zinc oxide. The amount of the vulcanization acceleration aid used is preferably 1 part by mass or more and 10 parts by mass or less with respect to 100 parts by mass of the base rubber.

(Other Components)

The rubber composition can use a compounding agent which is generally used as a compounding agent for rubber, such as a filler, a processing aid, an antioxidant, a peptizer, and a pigment, as long as the purpose of the present disclosure is not impaired.

As the filler, those generally used as a compounding agent for rubber can be used, and examples thereof include carbon black, silica, calcium carbonate, talc, clay, magnesium carbonate, aluminum oxide and the like. By incorporating the filler, the mechanical strength or the like of the obtained roller can be improved.

The content of the filler is preferably 3 parts by mass or more, more preferably 5 parts by mass or more, and further preferably 10 parts by mass or more, and preferably 100 parts by mass or less, more preferably 70 parts by mass or less, further preferably 50 parts by mass or less, and particularly preferably 28 parts by mass or less with respect to 100 parts by mass of the base rubber.

When carbon black is incorporated as the filler, the content of carbon black is preferably 3 parts by mass or less, and more preferably 1 part by mass or less with respect to 100 parts by mass of the base rubber. By reducing the incorporated amount of carbon black, it is possible to suppress contamination of the transported sheet.

Examples of the processing aid include fatty acids (stearic acid and the like) having 12 to 30 carbon atoms, fatty acid esters, fatty acid metal salts, fatty acid amides, hydrocarbons (paraffin), process oils and the like.

Examples of the antioxidant include nickel diethyldithiocarbamate, nickel dibutyldithiocarbamate, and the like.

The hardness (durometer method, type A hardness) of the cured product of the rubber composition is preferably 10 or more, more preferably 15 or more, and further preferably 20 or more, and preferably 90 or less, more preferably 85 or less, and further preferably 80 or less. When the hardness of the cured product is 10 or more, the hardness becomes suitable for sheet transport and the transport force is further improved, and when the hardness is 90 or less, the press-fitting of the roller shaft is easier.

<Production of Sheet Transport Roller Rubber Composition>

The sheet transport roller rubber composition can be prepared by incorporating a base rubber and, if necessary, other raw materials, and kneading these with a kneader, a Banbury mixer, an open roll, or the like. The method and conditions of kneading are appropriately selected depending on the production scale.

It is preferable that a method for producing the rubber composition include: a first step of mixing a base rubber and a coumarone-indene resin to prepare a mixture; and a second step of mixing the mixture with a sulfur-based crosslinking agent to prepare a rubber composition. In other words, the rubber composition is preferably obtained by mixing a base rubber and a coumarone-indene resin to obtain a mixture, and then mixing this mixture with a sulfur-based crosslinking agent.

In the first step, the base rubber and the coumarone-indene resin are mixed with each other to prepare a mixture. The mixing temperature (material temperature) when the base rubber and the coumarone-indene resin are mixed is preferably equal to or higher than the softening point of the coumarone-indene resin. By mixing at a temperature equal to or higher than the softening point of the coumarone-indene resin, uniform mixing with the rubber is possible. The mixing temperature in the first step is more preferably T+3° C. or higher, and further preferably T+5° C. or higher, when the softening point of the coumarone-indene resin is T° C. The upper limit of the mixing temperature in the first step is not particularly limited, but is usually less than 200° C.

The mixing in the first step can be performed by a kneader, a Banbury mixer, an open roll, or the like, and is preferably performed by a kneader.

In the first step, only the base rubber and the coumarone-indene resin may be mixed with each other, or other components (vulcanization accelerator, vulcanization acceleration aid, filler, processing aid, and antioxidant) other than the sulfur-based crosslinking agent may also be mixed in.

In the second step, the mixture and a sulfur-based crosslinking agent are mixed to prepare a rubber composition. The mixing temperature (material temperature) at the time of mixing the mixture and the sulfur-based crosslinking agent is preferably 30° C. or higher, more preferably 40° C. or higher, and further preferably 50° C. or higher, and preferably 150° C. or lower, more preferably 120° C. or lower, and more preferably 100° C. or lower.

The mixing in the second step can be performed by a kneader, a Banbury mixer, an open roll, or the like, and is preferably performed by an open roll.

<Sheet Transport Roller>

The sheet transport roller of the present disclosure is obtained by curing the sheet transport roller rubber composition.

Examples of the shape of the sheet transport roller include a cylindrical shape, a columnar shape, a polygonal cylindrical shape, and a polygonal columnar shape. When the sheet transport roller has a cylindrical shape or a polygonal cylindrical shape, it is preferable that the paper feed roller have a shaft. The material of the shaft is not particularly limited, and examples thereof include metals, ceramics, and resins.

FIG. 1 shows an example of the sheet transport roller. The sheet transport roller 1 shown in FIG. 1 includes a roller main body 2 formed by molding the above-described rubber composition of the present disclosure into a cylindrical shape and crosslinking the rubber composition. A through-hole 3 having a circular cross section is provided at the center of the roller main body 2, and a columnar shaft 4 connected to a driving system (not shown) is inserted and fixed in the through-hole 3. The outer peripheral surface of the roller main body 2 is formed in a tubular shape concentric with the through-hole 3 and the shaft 4.

The roller main body 2 and the shaft 4 are fixed to each other so as not to cause idling, for example, by press-fitting the shaft 4 having an outer diameter larger than the inner diameter of the through-hole 3 into the through-hole 3 of the roller main body 2. In other words, due to the tightening allowance based on the diameter difference between the two, a constant idling torque (the limit torque at which idling does not occur) is secured therebetween.

The shaft 4 is made of, for example, metal, ceramic, hard resin, or the like. A plurality of roller main bodies 2 may be fixed to a plurality of locations on one shaft 4, if necessary.

Examples of the method for producing the roller main body 2 include a method in which a rubber composition is molded into a cylindrical shape by an extrusion molding method or the like and then crosslinked by a press crosslinking method or the like; and a method in which a rubber composition is molded into a cylindrical shape and crosslinked by a transfer molding method and the like.

The roller main body 2 may be polished such that the outer peripheral surface has a predetermined surface roughness, or may be knurled, grained, or the like, if necessary, at any time in the producing process. Further, both ends of the roller main body 2 may be cut such that the outer peripheral surface has a predetermined width. The outer peripheral surface of the roller main body 2 may be covered with any coat layer.

Further, the roller main body 2 may be formed in a two-layer structure of an outer layer on the outer peripheral surface side and an inner layer on the through-hole 3 side. In this case, it is preferable that at least the outer layer be formed by the rubber composition of the present disclosure. However, in consideration of simplifying the structure, improving productivity, and reducing the producing cost, it is preferable that the roller main body 2 have a single-layer structure as shown in FIG. 1.

Further, the roller main body 2 may have a porous structure. However, in order to improve wear resistance and reduce compression set such that dents due to deformation are less likely to occur even when the state of being in contact at one location continues for a relatively long period of time, the roller main body 2 is preferably a substantially non-porous structure.

The through-hole 3 may be provided at a position eccentric from the center of the roller main body 2 depending on the application of the sheet transport roller 1. Further, the outer peripheral surface of the roller main body 2 may have a deformed shape instead of a cylindrical shape, for example, a shape in which a part of the outer peripheral surface of the cylindrical shape is cut out into a plane shape or the like. In order to produce the sheet transport roller 1 provided having these deformed-shaped roller main bodies 2, the deformed-shaped roller main body 2 may be directly molded and then crosslinked by the above-described producing method, or the roller main body 2 molded into a cylindrical shape may have a deformed shape by post-processing.

Further, the roller main body 2 may be deformed into a deformed shape by press-fitting the shaft 4 having a deformed shape corresponding to the deformed shape of the roller main body 2, into the through-hole 3 of the roller main body 2 molded into a cylindrical shape.

In this case, polishing, knurling, grain processing or the like of the outer peripheral surface 5 can be performed on the cylindrical outer peripheral surface 5 before deformation, and thus processability can be improved.

<Image Forming Apparatus>

The sheet transport roller of the present disclosure can be integrated into various image forming apparatuses using an electrophotographic method, such as a laser printer, an electrostatic copier, a plain paper facsimile machine, or a combination machine thereof. Further, the sheet transport roller of the present disclosure can also be integrated into, for example, an ink jet printer, an ATM, or the like.

The sheet transport roller of the present disclosure rotates while in contact with a sheet, and transports the sheet by friction. Examples of the sheet include single sheets such as sheet of paper and continuous sheets such as continuous paper. The sheet transport roller can be used as, for example, a paper feed roller, a transport roller, a platen roller, a paper discharge roller, or the like.

EXAMPLES

Hereinafter, the present disclosure will be described in detail by Examples, but the present disclosure is not limited to the following Examples, and any changes and embodiments that do not deviate from the purpose of the present disclosure are included within the range of the present disclosure.

[Evaluation Method]

(1) Hardness

The hardness of the cured product of the rubber composition was measured in accordance with JIS K6253-3 (2012). Specifically, by pressing at 160° C. for 30 minutes using the rubber composition, a sheet having a thickness of 2 mm was manufactured. In a state where three sheets were placed on top of each other so as not to be affected by the measurement substrate or the like, the pressure plate of the type A durometer was contacted, and the numerical value was read 3 seconds after the contact.

(2) Friction Coefficient Measurement

Figure 2:
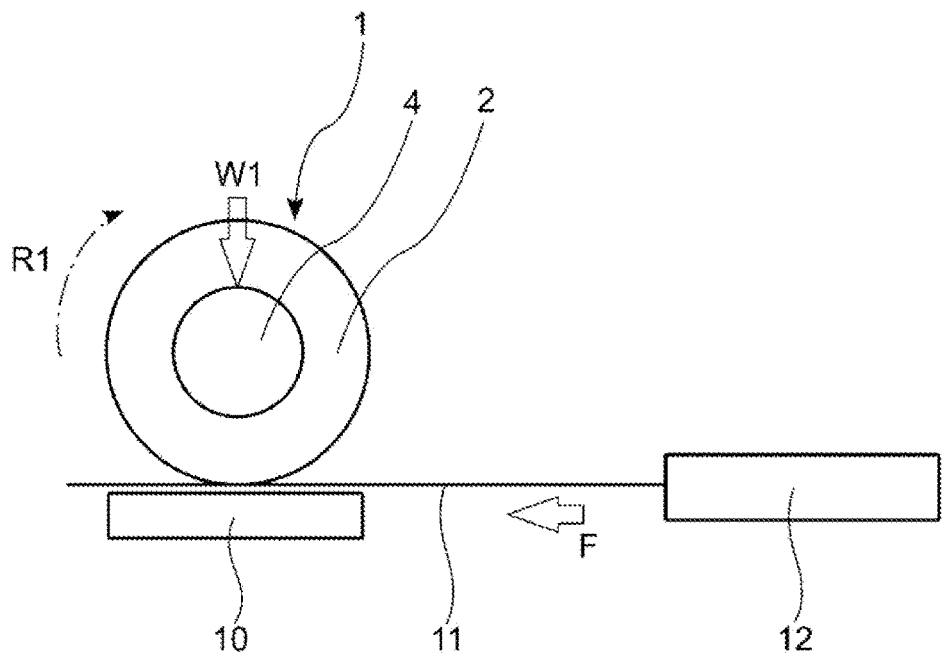
FIG. 2 is a schematic view describing a friction coefficient measuring method.

As shown in FIG. 2, a plain paper sheet 11 (P paper manufactured by FUJIFILM Business Innovation Corp.) was placed on a horizontally installed plate 10 made of polytetrafluoroethylene (PTFE). The roller main body 2 of the sheet transport roller 1 was placed on the paper sheet 11, and a vertical load W1 (=300 gf) was applied to the shaft 4 which was pressed against the plate 10.

Next, when the roller main body 2 was rotated at 200 rpm in the direction indicated by the arrow R1 of the one dot dashed line in an environment of a temperature of 23° C. and a relative humidity of 55%, a transport force F (gf) applied to a load cell 12 connected to one end of the paper sheet 11 was measured.

The initial friction coefficient was obtained from the measured transport force F and the vertical load W1 (=300 gf) by Equation (1).

$$\mu = F(gf)/W1(gf) \tag{1}$$

(3) Forced Wear Test

As shown in FIG. 2, the plain paper sheet 11 (P paper manufactured by FUJIFILM Business Innovation Corp.) was placed on a horizontally installed plate 10 made of polytetrafluoroethylene (PTFE). The roller main body 2 of the sheet transport roller 1 was placed on the paper sheet 11, and the vertical load W1 (=500 gf) was applied to the shaft 4 and pressed against the plate 10.

Next, in an environment of a temperature of 23° C. and a relative humidity of 55%, the roller main body 2 was continuously rotated at 200 rpm for 10 minutes in the direction indicated by the arrow R1 of the one dot dashed line. After this, wear reduction rate (%) was obtained from a mass $W_0$ (g) of the roller main body 2 before the rotation and a mass W1 (g) of the roller main body 2 after the rotation by the following Equation (2).

$$\text{Wear reduction rate } (\%) = 100 \times (W_0 - W_1)/W_0 \tag{Equation 2}$$

[Preparation of Rubber Composition]

Each raw material was mixed in to prepare a rubber composition so as to have the formulation shown in Table 1. Specifically, first, each raw material other than the crosslinking agent was mixed in using a kneader to prepare a mixture. At this time, the mixture was mixed for 1 minute after the temperature (material temperature) in the kneader tank reached 105° C. Then, the obtained mixture and the crosslinking agent were mixed using an open roll to prepare a rubber composition. At this time, the set temperature (material temperature) of the open roll was set to 50° C. Table 1 shows the measurement results of the cured product of the obtained rubber composition.

For the friction coefficient, the indexed value is also shown. The rubber compositions No. 1 to 6 were indexed with the friction coefficient of the rubber composition No. 4 set to 100. The rubber compositions No. 7 to 9 were indexed while the friction coefficient of the rubber composition No. 8 was set to 100. The rubber compositions No. 10 to 12 were indexed while the friction coefficient of the rubber composition No. 11 was set to 100.

The rubber compositions No. 1 to 3, 7, and 10 may contain an ethylene-α-olefin-diene copolymer as a base rubber, a sulfur-based crosslinking agent, and a coumarone-indene resin. The rubber compositions No. 4, 8, and 11 may contain an ethylene-α-olefin-diene copolymer as a base

| Rubber composition No. | | | 1 | 2 | 3 | 4 | 5 | 6 | 7 | 8 | 9 | 10 | 11 | 12 |
|---|---|---|---|---|---|---|---|---|---|---|---|---|---|---|
| Formulation (parts by mass) | Base rubber | EPDM 1 | 100 | 100 | 100 | 100 | 100 | 100 | 100 | 100 | 100 | — | — | — |
| | | EPDM 2 | — | — | — | — | — | — | — | — | — | 200 | 200 | 200 |
| | Coumarone-indene resin | | 3 | 5 | 12 | — | 5 | 10 | 4 | — | 4 | 6 | — | 6 |
| | Crosslinking agent | Sulfur | 1 | 1 | 1 | 1 | — | — | 1 | 1 | — | 1 | 1 | — |
| | | Organic peroxide | — | — | — | — | 3 | 3 | — | — | 3 | — | — | 3 |
| | Vulcanization accelerator 1 | | 3 | 3 | 3 | 3 | — | — | 3 | 3 | — | 3 | 3 | — |
| | Vulcanization accelerator 2 | | 2 | 2 | 2 | 2 | — | — | 2 | 2 | — | 2 | 2 | — |
| | Zinc oxide | | 5 | 5 | 5 | 5 | 5 | 5 | 5 | 5 | 5 | 5 | 5 | 5 |
| | Stearic acid | | 1 | 1 | 1 | 1 | 1 | 1 | 1 | 1 | 1 | 1 | 1 | 1 |
| | Filler | Carbon black | 0.5 | 0.5 | 0.5 | 0.5 | 0.5 | 0.5 | 10 | 10 | 10 | 0.5 | 0.5 | 0.5 |
| | | Calcium carbonate | 25 | 25 | 25 | 25 | 25 | 25 | — | — | — | 25 | 25 | 25 |
| Cured product evaluation | Hardness (type A) | | 51 | 51 | 51 | 51 | 45 | 43 | 52 | 52 | 46 | 35 | 35 | 33 |
| Roller evaluation | Friction coefficient | | 1.90 | 1.96 | 1.92 | 1.77 | 1.88 | 1.86 | 1.98 | 1.85 | 1.81 | 2.35 | 2.09 | 2.29 |
| | Friction coefficient (indexed value) | | 107 | 111 | 108 | 100 | 106 | 105 | 107 | 100 | 98 | 112 | 100 | 110 |
| | Wear reduction rate (%) | | 0.11 | 0.14 | 0.18 | 0.04 | 1.68 | 3.83 | 0.17 | 0.06 | 1.15 | 0.05 | 0.01 | 1.03 |

The raw materials used in Table 1 are as follows.

EPDM 1: "Esprene (registered trademark) 505A" (ethylene-propylene-ethylidene norbornene copolymer, ethylene content 50% by mass, diene component content 9.5% by mass) manufactured by Sumitomo Chemical Co., Ltd.

EPDM 2: "Esprene 670F" (oil-extended EPDM) (ethylene content 66% by mass, diene component content 4.0% by mass, oil addition amount 100 parts by mass with respect to 100 parts by mass of EPDM) manufactured by Sumitomo Chemical Co., Ltd.

Coumarone-indene resin: "Knit Resin (registered trademark) Coumarone G-90" (coumarone-indene-styrene copolymer resin, softening point 90° C.) manufactured by Nitto Chemical Co., Ltd.

Sulfur: sulfur with 5% oil manufactured by Tsurumi Chemical Industry Co., Ltd.

Organic peroxide: "PERCUMYL (registered trademark) D" (dicumyl peroxide) manufactured by NOF CORPORATION Vulcanization accelerator 1: "Noxeller (registered trademark) TOT-N" (tetrakis(2-ethylhexyl)thiuram disulfide) manufactured by Ouchi-Shinko Chemical Industrial Co., Ltd.

Vulcanization accelerator 2: "Noxeller DM" (di-2-benzothiazyl disulfide) manufactured by Ouchi-Shinko Chemical Industrial Co., Ltd.

Zinc oxide: Two types of zinc oxide manufactured by Mitsui Mining & Smelting Co., Ltd.

Stearic acid: Stearic acid CAMELLIA manufactured by NOF CORPORATION Carbon Black: Seast (registered trademark) 3 manufactured by Tokai Carbon Co., Ltd.

Calcium carbonate: BF-300 manufactured by Bihoku Funka Kogyo Co., Ltd.

[Production of Sheet Transport Roller]

The rubber composition obtained above was molded into a cylindrical shape by transfer molding under the molding condition of 165° C. and 30 minutes. A shaft (outer diameter 12 mm) was press-fitted into a cylindrical molded article, a cylindrical grinding machine was used to polish the molded article such that the outer diameter of the rubber roller was 21 mm, and the rubber roller part was cut to a width of 25 mm to manufacture a sheet transport roller. The evaluation results of the obtained sheet transport rollers are shown in Table 1.

rubber, a sulfur-based crosslinking agent, and may not contain a coumarone-indene resin.

The sheet transport rollers formed of the rubber compositions No. 1 to 3, 7, and 10 all had a low wear reduction rate and excellent wear resistance. In addition, in the sheet transport rollers formed of the rubber compositions No. 1 to 3, the friction coefficient was improved compared to that of the sheet transport roller formed of the rubber composition No. 4 that does not contain a coumarone-indene resin. Similarly, in the sheet transport rollers formed of the rubber compositions No. 7 to 10, the friction coefficient was improved compared to that of the sheet transport roller formed of the rubber composition No. 8 or 11 that does not contain a coumarone-indene resin.

The rubber compositions No. 5, 6, 9, and 12 may contain an ethylene-α-olefin-diene copolymer as a base rubber, an organic peroxide-based crosslinking agent, and a coumarone-indene resin. The sheet transport rollers formed of these rubber compositions No. 5, 6, 9, and 12 had an excellent friction coefficient but extremely poor wear resistance.

According to the present disclosure (1), there is provided a sheet transport roller rubber composition containing an ethylene-α-olefin-diene copolymer as a base rubber, a sulfur-based crosslinking agent, and a coumarone-indene resin.

According to the present disclosure (2), in the sheet transport roller rubber composition according to the present disclosure (1), a content of the coumarone-indene resin is 1 part by mass to 15 parts by mass with respect to 100 parts by mass of the base rubber.

According to the present disclosure (3), in the sheet transport roller rubber composition according to the present disclosure (1) or (2), the sheet transport roller rubber composition is obtained by mixing the base rubber and the coumarone-indene resin at a temperature equal to or higher than a softening point of the coumarone-indene resin to prepare a mixture, and then mixing this mixture with a sulfur-based crosslinking agent.

According to the present disclosure (4), there is provided a sheet transport roller obtained by curing the sheet transport roller rubber composition according to any one of the present disclosures (1) to (3).

What is claimed is:

1. A sheet transport roller rubber composition, containing an ethylene-α-olefin-diene copolymer as a base rubber, a sulfur-based crosslinking agent, and a coumarone-indene resin,
wherein a content of the coumarone-indene resin is 4 parts by mass to 15 parts by mass with respect to 100 parts by mass of the base rubber.

2. The sheet transport roller rubber composition according to claim 1, wherein
the sheet transport roller rubber composition is obtained by mixing the base rubber and the coumarone-indene resin at a temperature equal to or higher than a softening point of the coumarone-indene resin to prepare a mixture, and then mixing this mixture with a sulfur-based crosslinking agent.

3. A sheet transport roller obtained by curing the sheet transport roller rubber composition according to claim 1.

4. A sheet transport roller obtained by curing the sheet transport roller rubber composition according to claim 2.

5. The sheet transport roller rubber composition according to claim 1, wherein
the coumarone-indene resin contains one or more monomer components other than coumarones and indenes selected from the group consisting of styrene, vinyltoluene and dicyclopentadiene.

* * * * *